United States Patent
Cabuz et al.

(10) Patent No.: US 6,211,580 B1
(45) Date of Patent: *Apr. 3, 2001

(54) TWIN CONFIGURATION FOR INCREASED LIFE TIME IN TOUCH MODE ELECTROSTATIC ACTUATORS

(75) Inventors: Cleopatra Cabuz; Eugen I. Cabuz, both of Edina, MN (US)

(73) Assignee: Honeywell International Inc., Morristown, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/222,096

(22) Filed: Dec. 29, 1998

(51) Int. Cl.$^7$ .................................................. H01H 19/64

(52) U.S. Cl. ........................................... 307/113; 307/125

(58) Field of Search ..................................... 361/233, 234, 361/225, 207; 359/230; 200/181; 307/112, 113, 125; 365/244

(56) References Cited

U.S. PATENT DOCUMENTS

| | | | |
|---|---|---|---|
| 2,931,954 | * 4/1960 | Diesel | 317/144 |
| 4,065,677 | * 12/1977 | Micheron et al. | 307/112 |
| 4,979,149 | * 12/1990 | Popovic et al. | 365/244 |
| 5,062,689 | * 11/1991 | Koehler | 359/230 |
| 5,176,358 | 1/1993 | Bonne et al. | 251/30.05 |
| 5,477,097 | 12/1995 | Matsumoto | 310/309 |
| 5,542,295 | 8/1996 | Howe et al. | 73/514.18 |
| 5,677,823 | * 10/1997 | Smith | 361/234 |
| 5,771,116 | 6/1998 | Miller et al. | 359/295 |
| 5,772,902 | 6/1999 | Reed et al. | 216/2 |
| 5,822,170 | * 10/1998 | Cubuz et al. | 361/225 |

FOREIGN PATENT DOCUMENTS

0746013 A2    12/1996    (EP).

OTHER PUBLICATIONS

C. Cabuz, et al., "High Reliability Touch–Mode Electrostatic Actuators", Technical Digest of the Solid State Sensor and Actuator, Workshop Hilton Head, S.C., Jun. 8–11, 1998, pp. 296–299.

C. Cabuz, "Tradeoffs in MOEMS Materials" Proceedings of the SPIE, vol. 2881, pp 160–170, Austin, Tx. (date unknown).

* cited by examiner

Primary Examiner—Stephen W. Jackson
Assistant Examiner—Sharon Polk
(74) Attorney, Agent, or Firm—John G. Shudy, Jr.

(57) ABSTRACT

An electrostatic actuator and drive configuration device for use in a system requiring a long term ON state operation. The device includes a first electrostatic actuator positioned to operate in the system requiring the long term ON state upon activation of a power supply. The device also includes a second electrostatic actuator positioned to operate in the system requiring the long term ON state upon activation of the power supply. A timer is connected to the power supply to alternately select the first or the second actuator for activation to drive the selected actuator to the ON state. The timer is controlled to select the first or second electrostatic actuator on an alternating basis to prevent either electrostatic actuator from remaining in the ON state for more than a predetermined time without the other actuator being selected. The electrostatic actuators may be configured in parallel or in series, depending upon the demands of the system. When the electrostatic actuators are switches, linear actuators or relays, they are normally connected side by side mechanically parallel. When the actuators are shutters, mirrors or valves, normal connection is in sequence end to end. When devices are selected to be in the ON condition, the selection should be such that each device is closed before the other is opened.

20 Claims, 2 Drawing Sheets

TWIN CONFIGURATION FOR INCREASED LIFE TIME IN TOUCH MODE ELECTROSTATIC ACTUATORS

FIELD OF THE INVENTION

The present invention relates to electrostatic actuators used in valves, switches, relays and shutters, among other uses. More particularly the invention relates to a configuration and actuation method for a dual actuators operable to allow ON/OFF action of each actuator while maintaining a stable system condition.

BACKGROUND OF THE INVENTION

Electrostatic actuators are preferred over other types of actuators in the applications where power consumption and weight are critical, Also, electrostatic actuation is the most suitable for being used in large arrays of actuators. Electrostatic actuators require low power, operate at high speed, and can be fabricated in a small size, presenting significant advantages over thermal, electromagnetic and piezoelectric actuators.

Electromagnetic actuation requires heavy magnetic materials and relatively large currents, and the construction of such devices is not compact enough to be suitable for actuation of large surfaces.

Electrothermally induced actuation is structurally suited for activator arrays, but has the drawbacks of high power requirements, low speed of response and, in many cases dependence on environmental temperatures.

Piezoelectric actuation, while structurally fitted for actuator arrays and uses low power with adequate or high speed, does not possess the displacements needed and are, in fact, so low as to be not useful for the above considered applications. Piezoelectric materials with increased performance have been proposed, but are both very expensive and heavier than would be acceptable.

In electrostatic actuators, the desired displacement is the result of the attractive electrostatic force generated by the interaction between a distribution of opposite sign charges placed on two bodies, one of which is moveable. For the purposes of this invention, these two bodies are known as actuator plates. The actuator plates are placed apart by a predetermined distance. The charge distribution is then generated by applying a potential difference between two conductive electrodes that are part of the actuator plates. The actuator will be in the ON state or mode when a potential difference is applied between the electrodes and will be in the OFF state when the electrodes are at the same potential.

In some electrostatic actuators, the actuator plates have to come in intimate contact during the normal operation cycle. These actuators are sometimes referred to as touch-mode electrostatic actuators. In order to prevent electrical shorting during the touch phase of the operation cycle, the conductive electrodes are isolated from each other by dielectric layers. In order to get maximum work from a specific device, large electric fields are usually developed between the two conductive electrodes. The non-linear character of the electrostatic attraction results in a snapping action, where the actuator plates move toward each other with accelerations as high as $10^8$ g and speeds that exceed $10^3$ m/sec. After the impact, the free surfaces of the actuator plates are pushed against each other by the large electrostatically generated pressure.

In electrostatic actuators such as valves, switches, relays, mirrors and shutters, the actuated electrodes have to stay in contact during the ON state. For long ON cycles, interface interactions, charge injection and trapping introduce difficulties of operation. The strong interaction forces being developed between the actuator plates can continue to act after removal of the potential difference between the actuator plates. In some cases, these forces are stronger than the restoring forces available for bringing the electrodes in their original position. In such a case, the two electrodes remain temporarily or permanently attached and the actuator stops functioning as intended and desired. This condition is sometimes referred to as 'stiction.' Long contact may even cause permanent stiction, rendering the device completely inoperative.

Using special driving voltages and hydrophobic coatings, it has been possible to increase the life time of touch-mode electrostatic actuators by several orders of magnitude. However, even now, when the actuators are kept in the ON state, or with contact between actuator plates, for long periods of time, such as a few days or longer, stiction still occurs. It would be of great advantage to the art if a device could be provided which overcame the problem of stiction.

It would be another great advance in the art if stiction could be avoided in systems without disturbing the system's requirement to remain in the ON mode for very long periods of time.

Other advantages will appear hereinafter.

SUMMARY OF THE INVENTION

It has now been discovered that the above and other advantages of the present invention may be realized in the following manner. Specifically, the present invention comprises a configuration of electrostatic actuators capable of avoiding long ON states without perturbing the system. For valve applications, the invention also provides increased working pressures, even up to the level of the hold pressure.

The present invention comprises a double device, mounted in the same package, which avoids perturbation of system operation. The two devices may be mounted in parallel or series configuration, depending on the type of actuator and/or application for the device.

BRIEF DESCRIPTION OF THE DRAWINGS

For a more complete understanding of the invention, reference is hereby made to the drawings, in which.

DETAILED DESCRIPTION OF THE PREFERRED EMBODIMENT

The present invention provides an improved electrostatic actuator and drive configuration for use in systems requiring a long term ON state condition. Specifically, the configuration of this invention is a double device, where both a first and a second electrostatic actuators are placed into the system of use in a position where each functions in the ON state for the same action in the system. For example, the actuators may be valves, shutters, switches, relays, mirrors and the like.

It is contemplated that the invention will function in any system, device or method in which an electrostatic actuator performs a function requiring the actuator to be in an ON state, where the power supply provides voltage to cause the moveable electrode or diaphragm of the cell or cells to move toward the stationary electrode of the cell or cells under electrostatic attraction. When the power supply no longer supplies the voltage, the moveable electrode or diaphragm will move away from the stationary electrode in a conventional manner. Any means or device for restoring the electrodes to the OFF or non-attracted state may be employed, such as buckled or curved movable electrodes and diaphragms, flap electrodes predispositioned to an OFF state, pairing cells so turning on one cell causes the paired cell to be turned off.

The pair of electrostatic actuators of the present invention are intended to be mounted in the same package, although they may also be paired in other configurations, depending upon the particular system or process into which they are incorporated. In order to avoid perturbation of the system operation, the two devices are mounted in parallel or series, depending on the type of actuator and or the application of them.

Figure 1:
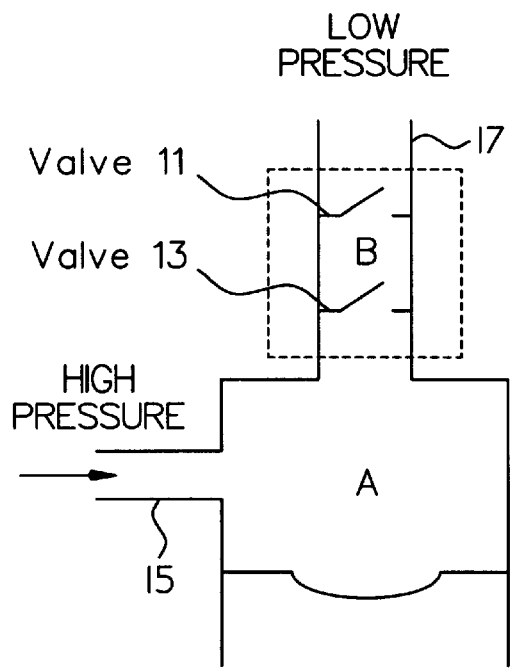
FIG. 1 is a schematic view of the present invention, illustrating the dual configuration of the invention functioning as a valve.

As part of the present invention, long term tests have led to the conclusion that stiction may be avoided if an actuator is opened at an interval of no more than about a few hours, more or less. However, for valve applications of electrostatic actuators, this presents a problem. The nonlinear dependence of the electrostatic force on the distance between the electrodes results in a low force when the actuator is opened, or in the OFF state, and a very high force when the actuator is closed. For a microvalve, this translates in a relatively low working pressure, for example, of about 6 psi, and a much higher holding pressure of, for example, about 24 psi. This means that if a valve is opened while the back pressure is 24 psi, it will not be possible to close it again until the pressure drops to the level of the working pressure, or 6 psi. This would obviously have a negative effect on the system. FIG. 1 illustrates a configuration of two electrostatic actuator valves 11 and 13 is shown, connected in series and operating between an inlet source of high pressure 15 in chamber A and a low pressure outlet 17 of chamber B.

Figure 4:
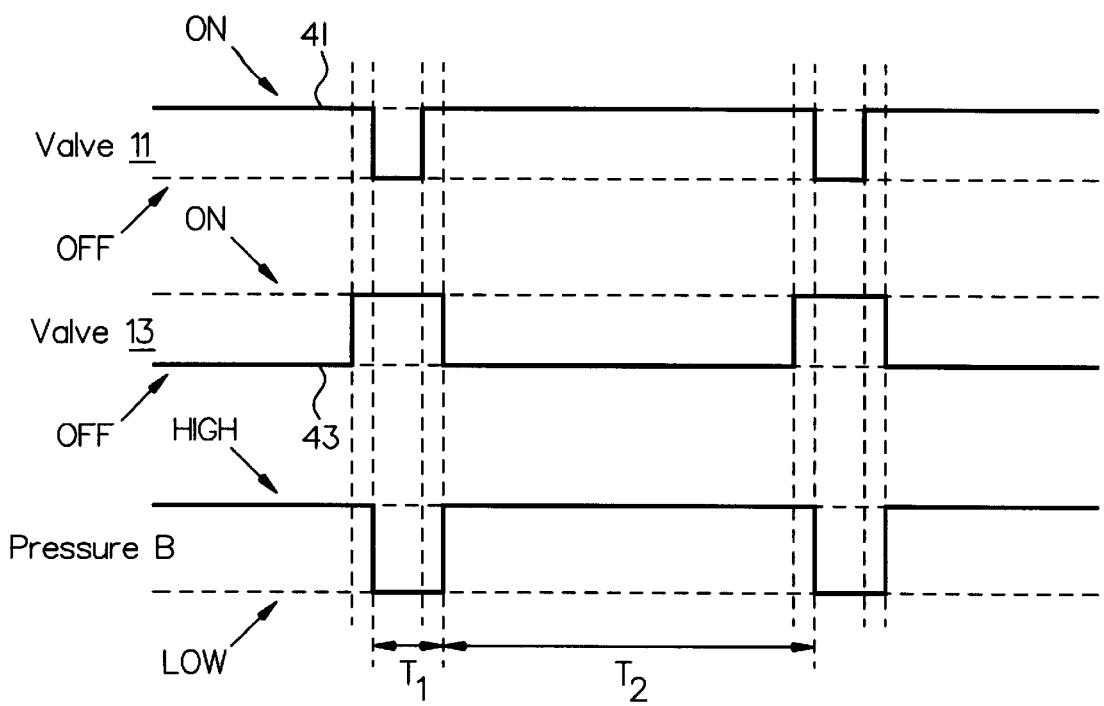
FIG. 4 is an illustration of the timing for activation of the dual configuration of FIG. 1.

Turning now to FIG. 4, the timing for the actuation of valves 11 and 13 is shown. Signal 41 causes valve 11 to be closed for the majority of time, it being opened only for short periods of time to avoid stiction. In order to keep pressure A at the desired high value, valve 13 has to be closed before opening valve 11. Using the concept of "make before break" as shown in FIG. 4, signal 43 controls valve 13 so that both valves 11 and 13 are reset. Of course, the rolls of valves 11 and 13 can be exchanged at any time in order to have a balanced use of the two actuators. If both valves 11 and 13 of FIG. 1 are closed at the connection of the pneumatic supply of high pressure, the timing or driving signals 41 and 43 of FIG. 4 permit control of a pressure equal to their holding pressure B. The power consumption of this system will not increase because only one actuator is in the ON state at a time. The short time necessary for the make before brake timing has a negligible contribution to the overall power consumption.

Figure 2:
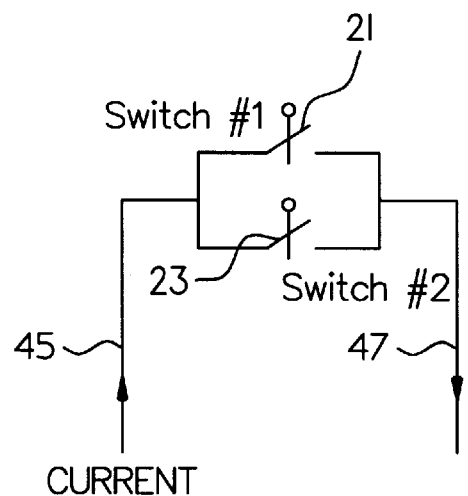
FIG. 2 is a schematic view of the present invention, illustrating the dual configuration of the invention functioning as a switch.
Figure 3:
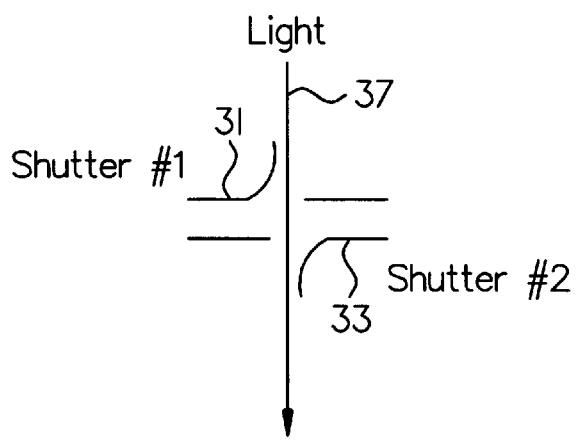
FIG. 3 is a schematic view of the present invention, illustrating the dual configuration of the invention functioning as a shutter.

While switches, relays and shutters are not faced with operating pressure difficulties, it is still unacceptable for these devices to change their state, though for short times, when the system requires a long ON condition. FIG. 2 illustrates a pair of switches 21 and 23, connected as twin parallel switches, so that current flows from input 45 to output 47 continuously while each switch 21 and 23 are open (or OFF) for sufficient time to prevent stiction. Similarly, FIG. 3 illustrates a pair of shutters 31 and 33 placed in twin series configuration, so light 37 can be interrupted by either, since the closed configuration is the ON state for these shutters.

Figure 5:
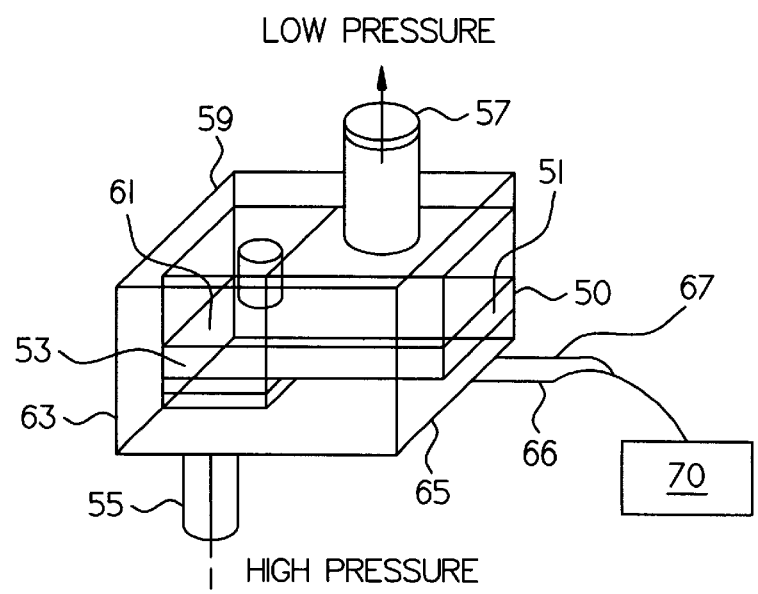
FIG. 5 is a schematic illustration of one embodiment for packaging of the twin-valve actuator of the present invention.

For both parallel and series configurations, the twin actuators of the present invention can be made together on the same substrate and packaged as a single device. The only additional cost for this approach would be the cost of an additional silicon area which, in most cases, is not a limiting factor. FIG. 5 illustrates a packaging of a twin valve actuator with a silicon twin chip 50 having two valve arrays 51 and 53. Input 55 admits high pressure and outlet 57 discharges low pressure into and out of package 59. The twin chip 50 is packaged at the wafer level inside machined Pyrex glass 63 forming the first level package and is mounted inside a secondary level package 65 including the inlet and outlet ports, 55 and 57 respectively, for air flow and the electrical connectors 66 and 67. The twin chip 50 is packaged at a wafer level 61 inside machined Pyrex glass 63, forming the first level package, and is mounted inside a second level package 65 including inlet 55 and outlet 57, and the connectors 66 and 67 for the power supply 70. Due to the increased working pressure of this type of configuration, proportional control can be achieved up to much higher pressures without the need for pneumatic amplifiers.

As will become apparent from the foregoing detailed description, the present invention is admirably suited for a variety of tasks where electrostatic actuators are employed, particularly where one or more actuators remains in an ON condition for any period of time. The dual activator configuration permits change from one actuator to the other at any predetermined time, usually in times ranging from several hours to less than one hour. As long as the predetermined time is less than that needed to permit stiction to occur, the system will operate as intended. While particular embodiments of the present invention have been illustrated and described, it is not intended to limit the invention, except as defined by the following claims.

What is claimed is:

1. An electrostatic actuator and drive configuration device for use in a system requiring a long term ON state operation, comprising:

a first electrostatic actuator positioned to operate in said system requiring said long term ON state upon activation by a first signal to drive said first actuator to an ON state to thereby provide a desired ON state operation in said system;

a second electrostatic actuator positioned to operate in said system requiring said long term ON state upon activation of a second signal to drive said second actuator to an ON state to thereby provide said same desired ON state operation in said system; and a power supply supplying said first and second signals to alternately select said first or said second electrostatic actuator for activation to drive said selected actuator to said ON state to maintain said desired ON state operation in said system, said first and second signals independently driving said first and second actuators, respectively to permit one or both actuators to be in an ON state.

2. The device of claim 1, wherein said power supply supplies said first and second signals on an alternating basis to prevent either of said first or second electrostatic actuators from remaining in said ON state for more than a predetermined time without the other of said first or second electrostatic actuators from being selected.

3. The device of claim 1, wherein said first and second electrostatic actuators are configured in parallel.

4. The device of claim 1, wherein said first and second electrostatic actuators are configured in series.

5. The device of claim 1, wherein said first and second electrostatic actuators are switches connected in parallel.

6. The device of claim 1, wherein said first and second electrostatic actuators are shutters connected in series.

7. The device of claim 1, wherein said first and second electrostatic actuators are first and second valves connected in series.

8. The device of claim 1, wherein said first and second electrostatic actuators are selected to be in said ON condition in a sequence where each said first and second actuator is closed before the other of said first and second actuators is opened.

9. An electrostatic actuator and drive configuration device for use in a system requiring a long term ON state operation, comprising:

first electrostatic actuator means positioned to operate in said system requiring said long term ON state upon activation of first signal means to drive said first actuator means to an ON state to thereby provide a desired ON state operation in said system;

second electrostatic actuator means positioned to operate in said system requiring said long term ON state upon activation second signal means to drive said second actuator means to an ON state to thereby provide said same desired ON state operation in said system; and power supply means supplying said first and second signal means to alternately select said first or said second electrostatic actuator means for activation to drive said selected actuator means to said ON state to maintain said desired ON state operation in said system, said first and second signals independently driving said first and second actuators, respectively to permit one or both actuators to be in an ON state.

10. The device of claim 9, wherein said power supply means supplies said first and second signal means on an alternating basis to prevent either of said first or second electrostatic actuator means from remaining in said ON state for more than a predetermined time without the other of said first or second electrostatic actuator means from being selected.

11. The device of claim 9, wherein said first and second electrostatic actuator means are configured in parallel.

12. The device of claim 9, wherein said first and second electrostatic actuator means are configured in series.

13. The device of claim 9, wherein said first and second electrostatic actuator means are switch means connected in parallel.

14. The device of claim 9, wherein said first and second electrostatic actuator means are shutter means connected in series.

15. The device of claim 9, wherein said first and second electrostatic actuator means are first and second valve means connected in series.

16. The device of claim 9, wherein said electrostatic actuator means are selected to be in said ON condition in a sequence where each said first and second electrostatic actuator means is closed before the other of said first and second electrostatic actuator means is opened.

17. A method of configuring an electrostatic actuator and drive device for use a system requiring a long term ON state operation, comprising the steps of:

positioning a first electrostatic actuator to operate in said system requiring said long term ON state upon activation of a first signal to drive said actuator to an ON state to thereby provide a desired ON state operation in said system;

positioning a second electrostatic actuator to operate in said system requiring said long term ON state upon activation of a second signal to drive said actuator to an ON state to thereby provide said same desired ON state operation in said system; and providing a power supply for supplying said first and second signal to alternately select said first or said second electrostatic actuator for activation to drive said selected actuator to said ON state to maintain said desired ON state operation in said system, said first and second signals independently driving said first and second actuators, respectively to permit one or both actuators to be in an ON state.

18. The method of claim 17, wherein said power supply means supplies said first and second signal means on an alternating basis to prevent either of said first or second electrostatic actuator means from remaining in said ON state for more than a predetermined time without the other of said first or second electrostatic actuator means from being selected.

19. The method of claim 17, wherein said first and second electrostatic actuators are first and second valves connected in series.

20. The method of claim 17, in which said valves are selected to be in said ON condition in a sequence where each said first and second valve is closed before the other of said first and second valves is opened.

* * * * *